United States Patent [19]
Yang

[11] Patent Number: 5,127,377
[45] Date of Patent: Jul. 7, 1992

[54] ROTARY MACHINE WITH OVAL PISTON IN TRIANGULAR CHAMBER

[76] Inventor: Chung-Chieh Yang, No. 21, Pa-Deh Road, Chia-An Village, Lung-Tan 32525, Taiwan

[21] Appl. No.: 567,562

[22] Filed: Aug. 15, 1990

[51] Int. Cl.⁵ .................. F02B 53/00; F01C 1/10; F01C 19/04; F01C 19/08
[52] U.S. Cl. .................. 123/242; 418/61.3; 418/91; 418/94; 418/117; 418/142
[58] Field of Search .............. 123/242; 418/61.3, 91, 418/94, 117, 142

[56] References Cited

U.S. PATENT DOCUMENTS

| | | | |
|---|---|---|---|
| 1,686,569 | 10/1928 | McMillan | 418/91 |
| 3,285,189 | 11/1966 | Doyer | 123/242 |
| 3,690,791 | 9/1972 | Dieter | 418/91 |
| 3,967,594 | 7/1976 | Campbell | 123/242 |
| 3,996,901 | 12/1976 | Gale et al. | 123/242 |
| 4,061,445 | 12/1977 | Doshi | 418/142 |
| 4,568,253 | 2/1986 | Wood | 418/94 |

FOREIGN PATENT DOCUMENTS

| | | | |
|---|---|---|---|
| 1202562 | 10/1965 | Fed. Rep. of Germany | 418/117 |
| 58-138201 | 8/1983 | Japan | 123/242 |
| 315800 | 10/1971 | U.S.S.R. | 418/91 |

*Primary Examiner*—John J. Vrablik

[57] ABSTRACT

A triangle rotation engine, which comprises an oval rotor repeatedly performing Auto cycle inside a cylinder block, which defines therein three cylinder walls, for driving a crank shaft slidably linked with the oval rotor for an output of power through two axles and two fanshaped wheels pivotally connected with the crank shaft so as to achieve the performance of an internal combustion engine.

1 Claim, 10 Drawing Sheets

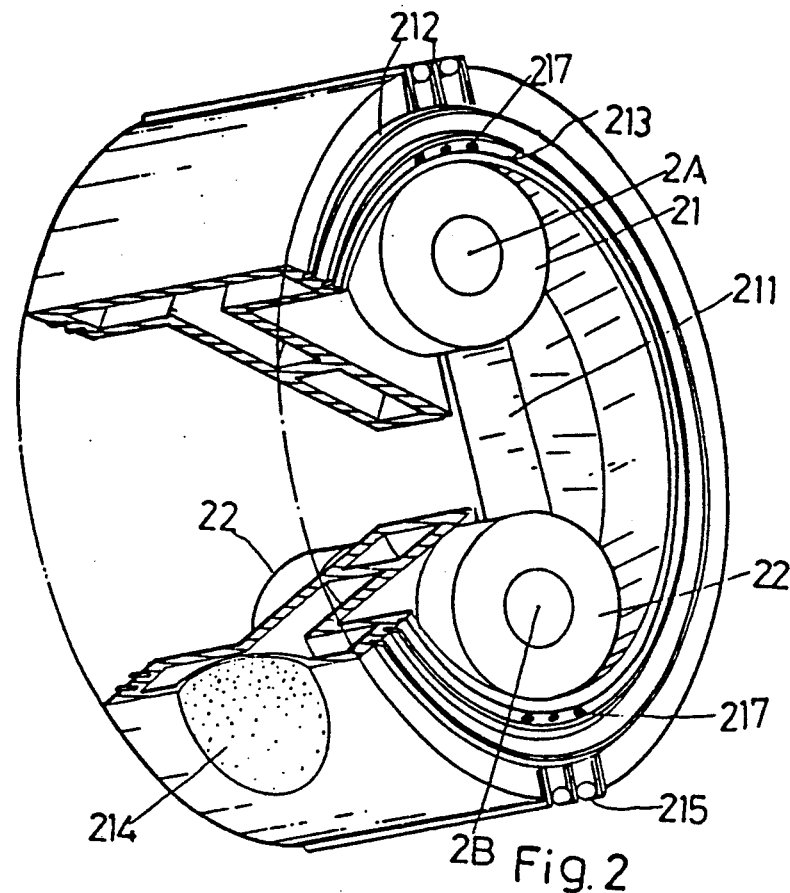
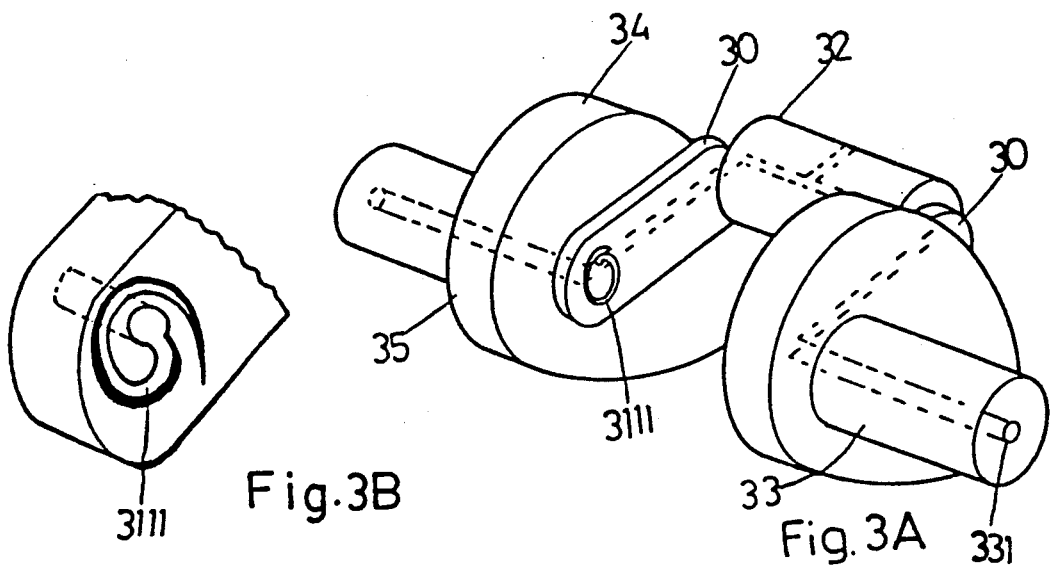

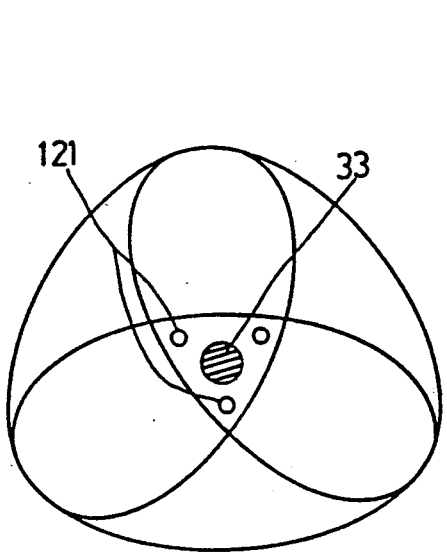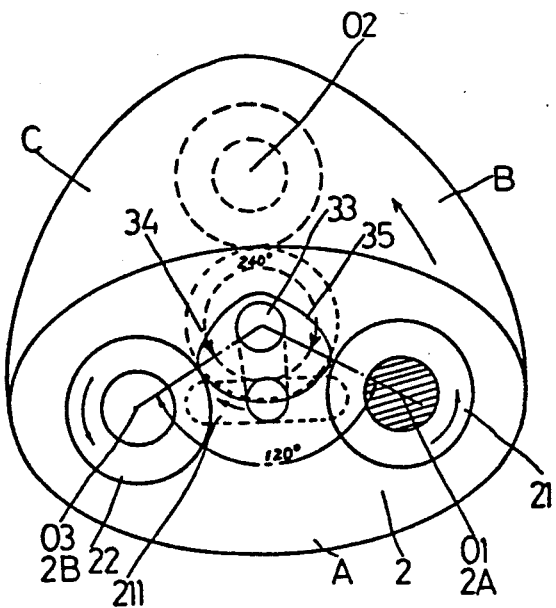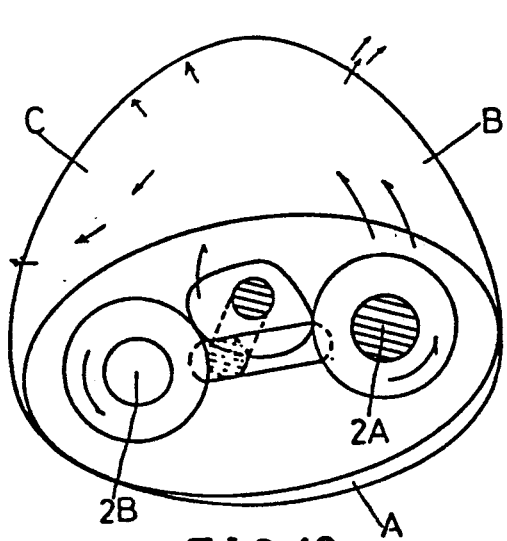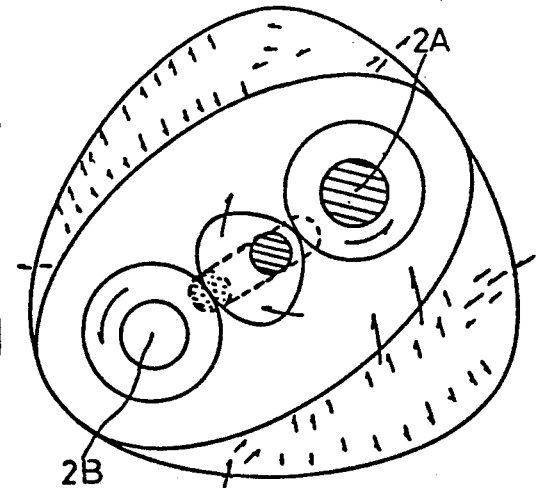
FIG.11　　　FIG.12
FIG.13　　　FIG.14

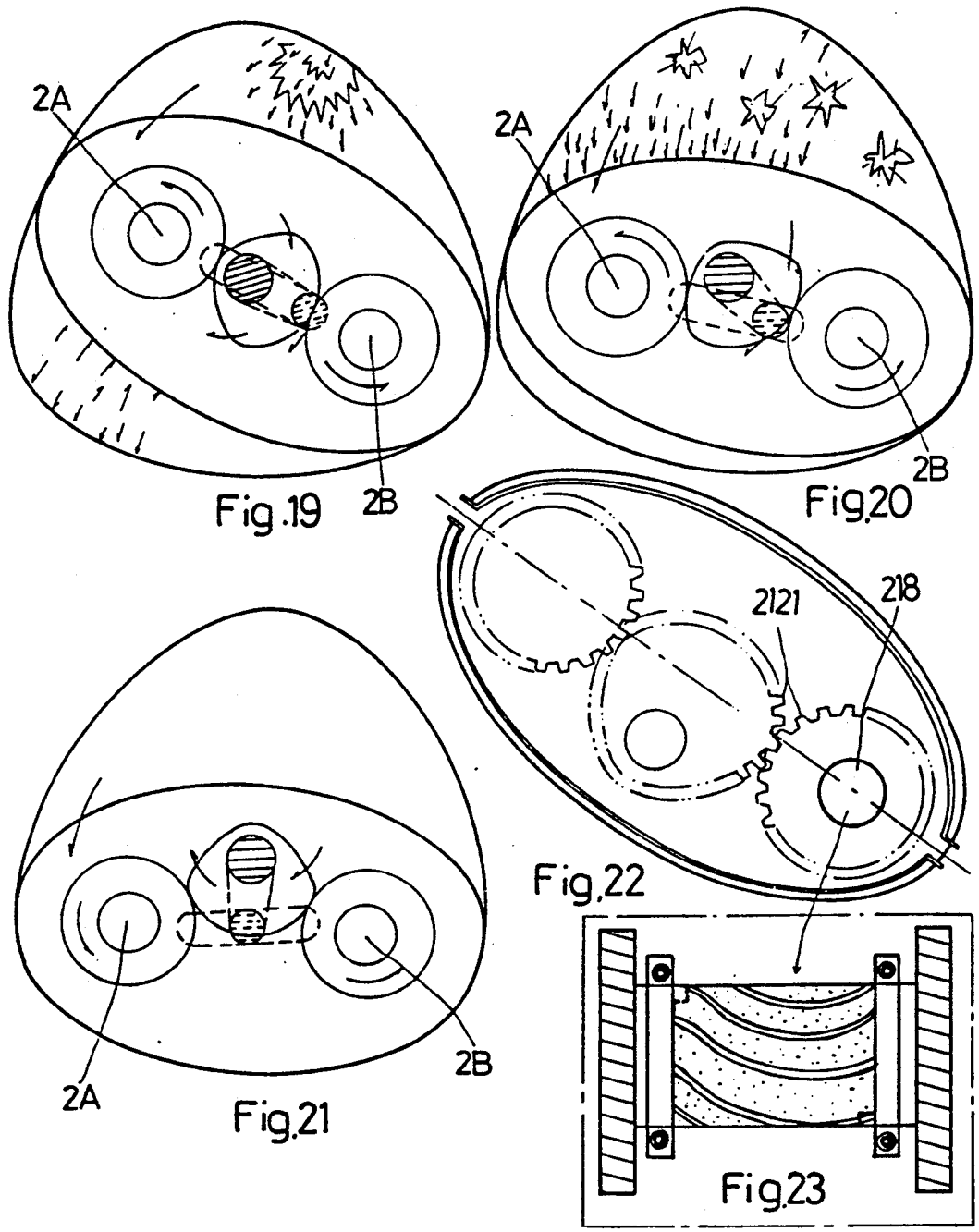

| order Auto Cycle Engine | A | B | C | Fig. | Rotor Cycle |
|---|---|---|---|---|---|
| 4 | Explos- | Exhaust Explos- | Exhaust |  | 1 |
| 3 | Compress | Explos- | Compress Explos- |  | 3 |
| 2 | Compress Intake | Compress | Intake |  | 2 |
| 1 | Intake | Exhaust Intake | Exhaust |  | 1 |
| 12 | Exhaust | Explos- | Explos- Exhaust |  | 3 |
| 11 | Compress Explos | Compress | Explos |  | 2 |
| 10 | Intake | Compress Intake | Compress |  | 1 |
| 9 | Exhaust | Intake | Exhaust Intake |  | 3 |
| 8 | Exhaust EXplos- | Exhaust | Explos- |  | 2 |
| 7 | Explos- | Compress Explos- | Compress |  | 1 |
| 6 | Compress- | Intake | Compress Intake |  | 3 |
| 5 | Exhaust Intake | Exhaust | Intake |  | 2 |
| 4 | Explos- | Explos- Exhaust | Exhaust- |  | 1 |
| 3 | Compress | Explosion | Compress Explos- |  | 3 |
| 2 | Compress- Intake | Compress | Intake |  | 2 |
| 1 | Intake | Exhaust- Intake | Exhaust- |  | 1 |

Fig. 24

ROTARY MACHINE WITH OVAL PISTON IN TRIANGULAR CHAMBER

BACKGROUND OF THE INVENTION

The present invention relates to a triangle rotation engine which comprises an oval rotor set to revolve along three cylinder walls inside a cylinder block to achieve the function of an internal combustion engine.

In 1878, Nicholas Auto disclosed an internal combustion engine to obtain power from heat and pressure produced by the combustion of a fuel-and-air mixture inside a closed cylinder. Today's engines are generally developed on the principle disclosed by Nicholas Auto. Certain period of years after Auto's disclosure, a compression ignition type of internal combustion engine was developed by Deisel. Few years after, 2-stroke (cycle) engine was developed. In the afore-said engines, a reciprocating piston is commonly used to produce power output. Several years after the invention of 2-stroke reciprocating engine, centrifugal type and axial-flow type of jet engines and stroke engines were developed one after another. In 1950, Wankel (German engineer and inventor) developed a rotary internal-combustion engine having a three-lobed rotor and requiring fewer parts than a comparable piston-operated engine. The common disadvantages of the traditional reciprocating engines and the recent rotary engines are numerous. These engines are heavy, complicated in structure, expensive to manufacture, or less efficient and less powerful, and or will produce strong vibration during operation. The present invention is designed to overcome the afore-said disadvantages. An engine according to the present invention can easily achieve high compression ration, produce high torque force, minimize space occupation, and fully utilize heat power.

In comparison with the conventional reciprocating engine, the present invention provides various advantages as outlined hereinafter.

A. MECHANICAL PROPERTY

1. No connecting rod is required

This invention does not require any connecting rod and is not ceaselessly rotated along a round circle. There is a certain obliquity on the forwarding route of the rotor starting from a dead point to prevent explosive force from directly vertically acting on the crank shaft. Distorted or cracked connecting rod events can be avoided.

2. Cylinder wear-off problem is eliminated

In a reciprocating engine, during transmission between rotational motion (crank shaft) and linear reciprocating motion (piston), a piston may be repeatedly carried by a connecting rod giving part of tangent force from such transmission to scratch the cylinder wall to further affect the compression process. Since no connecting rod is desinged in this invention, this problem can be eliminated.

3. High torque force is provided

The rotor of this inventions (serves as a piston in a reciprocating engine) acts on a crank shaft through lever motion (longer arm of force), therefore less power is required. In the same manner, stronger explosive force and torque force can be achieved (in direction proportion to the length of the arm of force). Therefore, even the engine is operated under low speed, high performance still can be achieved.

4. Short range of stroke is sufficient

As soon as the axes of the invention move through ⅔ run, i.e. 120° angle, a complete stroke is finished while it is 180° in a reciprocating engine. Short range of revolution stroke with longer enough dispacement of auto cycles achieves high efficiency and produces sufficient power.

5. Less vibration is produced

The present substantially rotational motion produces less vibration than the linear motion of the conventional reciprocating engines.

6. Less weight and space occupation are required

The present single rotor cylinder is equivalent to three comparable piston-operated engines (one common crank shaft in three cylinder walls), therefore size and weight can be greatly reduced and high power/weight ration can be achieved.

7. High compression ration is achieved

The invention design can efficiently increase compression ratio and its lever motion type of rotational stroke can efficiently eliminate compression resistance.

B. POWER

1. Same volume of cylinder

The power output of this invention is approximately 3 times over a comparable 4-stroke reciprocating engine or 1.5 times over a comparable 2-stroke reciprocating engine (see Annex. 1). It can also be designed in a 2-stroke (cycle) type to double its power output.

2. Inertia

The 60° rotation of YTRE's rotor produces rotational inertia approximately 3 times over the 180° reciprocating piston.

3. The fuel-air-mixture combustion of a rotational motion of the invention is obviously much better than the straight fuel gas intake type of engine.

In comparison with Wankel engine, the present invention provides various advantages as outlined hereinafter.

1. Uniform temperature: In Wankel engine, combustion stroke is performed at a fixed area to unfavorably affect lubrication effect on local cylinder wall and the barrier of the rotor and uniform temperature inside the cylinder can not be achieved. These problems are eliminated in the invention because explosion stroke is averagely resulted in the three cylinder walls.

2. Barrier: The barrier at the sharp end of the rotor in Wankel engine rubs against the flank portion of the cylinder block at a sharp angle. Therefore, strong vibration and damage on cylinder wall such as chatter marks can not be eliminated in Wankel engine. Even if material is improved, the problems still can not be completely eliminated. However, The barrier at the sharp end of the rotor in the invention is carried to slide against the three cylinder walls of the cylinder block through vertical 90° angle of circular arc so as to minimize friction resistace.

3. Torque force: Since Wankel engine utilizes a rotor to rotate on a main shaft along a peritrochoid high torque force can not be achieved, and high power output can only be achieved by increasing the revolving speed. As afore-described, the invention can produce high torque force.

4. Fuel gas intake and exhausting; In Wankel engine, fuel gas intake port and exhaust port will be overlapped when the rotor is rotated to a certain angle. Under this condition, the circulation of gas will be badly affected. In the invention, fuel gas intake ports and exhaust ports on either two of the three cylinder walls are simultaneously used for circulation. Better thermodynamic circulation is achieved.

5. Apex Sealing: The attack angle of the barrier (Apex Seal) during rotation in Wankel engine at the flank portion of the cylinder is too sharp to give good Apex-Sealing against explosion stroke. This problem is eliminated in YTRE.

SUMMARY OF THE INVENTION

The present invention is to provide a Yang's triangle rotation engine which comprises an oval rotor to revolve inside the three cylinder walls of a cylinder block for performing the Auto cycle of fuel gas intake, compression, explosion, and exhaustion so as to achieve the function of an internal combustion engine. Since the three cylinder walls are incorporated into one unit with a rotor (which serves as a piston in a reciprocating engine), it performs the function approximately three times over a conventional cylinder. Since no linkage is used, the size can be greatly reduced while horse power is relatively increased. Because several intake and exhaust ports can be simultaneously used during each stroke, the efficiency in intaking and exhausting stroke is greatly improved.

The rotor is designed for circulation therethrough of air and engine oil, better lubricating and cooling effects can be achieved. The rotor is constantly disposed to contact the cylinder walls during its rotary motion around a circle, high compression ratio is simultaneously achieved as needed.

BRIEF DESCRIPTION OF THE DRAWINGS

The present invention will now be described by way of examples, with reference to the annexed drawings, in which

FIG. 1—1 is a perspective sectional view of the cylinder block;

FIG. 2 is a perspective and partly sectional view of the rotor of the preferred embodiment of the present invention;

FIG. 3A is a perspective view of the crank shaft;

FIG. 3B is a partially enlarged view of the crank shaft from FIG. 3A.

FIG. 11 is a schematic drawing illustrating circulation of gas and engine oil inside the cylinder block;

FIG. 12 is a schematic drawing illustrating the relative relations among the internal parts;

FIGS. 13 through 15, illustrate the continuous motion of the first stroke according to the present invention;

FIGS. 15 through 17 illustrate the continuous motion of the second stroke according to the present invention;

FIGS. 17 through 20 illustrate the continuous motion of the third stroke according to the present invention;

FIG. 21 is a schematic drawing illustrating that the rotor returns to the original position after completion of the third stroke;

FIG. 22 illustrates an alternate form of the rotor with reinforced transmission mechanism for use in a big scale engine; and FIG. 23 is a partly enlarged view taken on FIG. 22 regarding a screw pump on the Axis of pulley wheels.

FIG. 24 illustrates the works performed at the cylinder walls at two opposite sides of the rotor in counter-clockwise direction during the rotary motion of the rotor.

DETAILED DESCRIPTION OF THE PREFERRED EMBODIMENT

A. STRUCTURE

1. Cylinder

Figure 1:
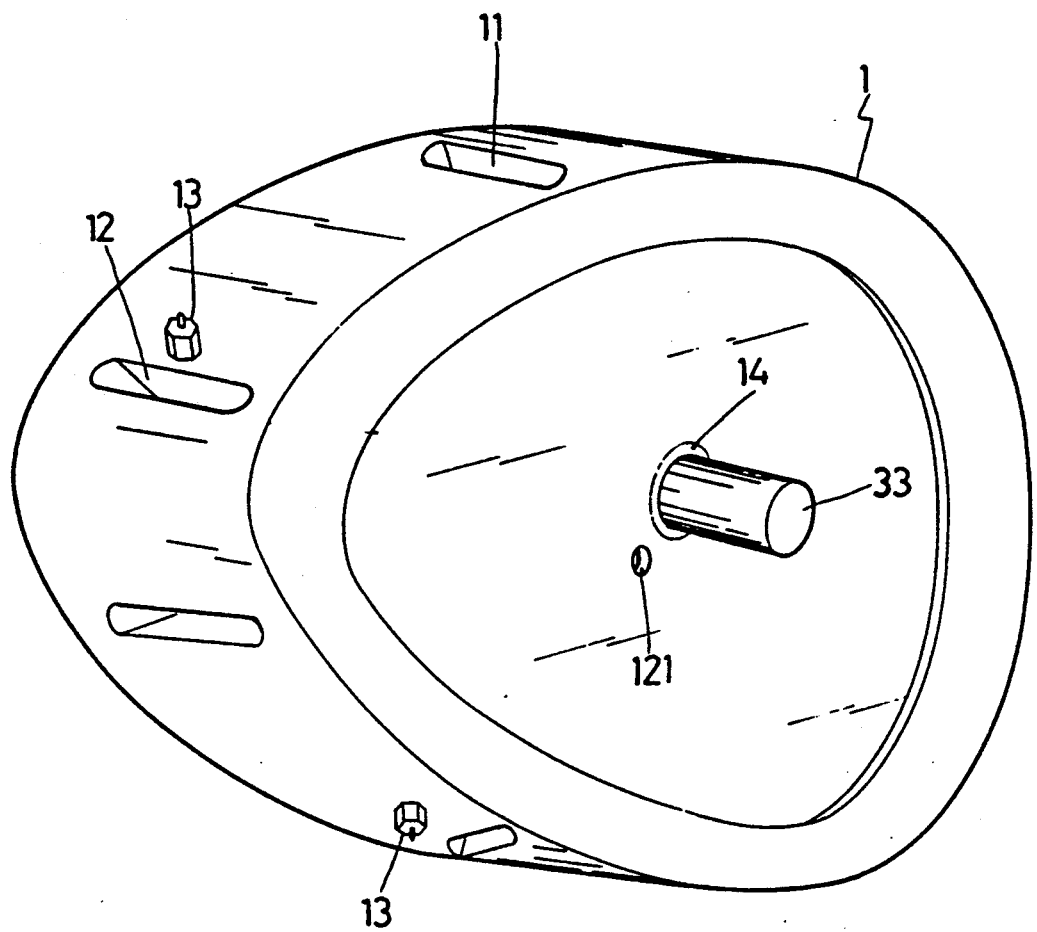
FIG. 1 illustrates the outer appearance of the cylinder block of the preferred embodiment of the present invention.
Figure 1:
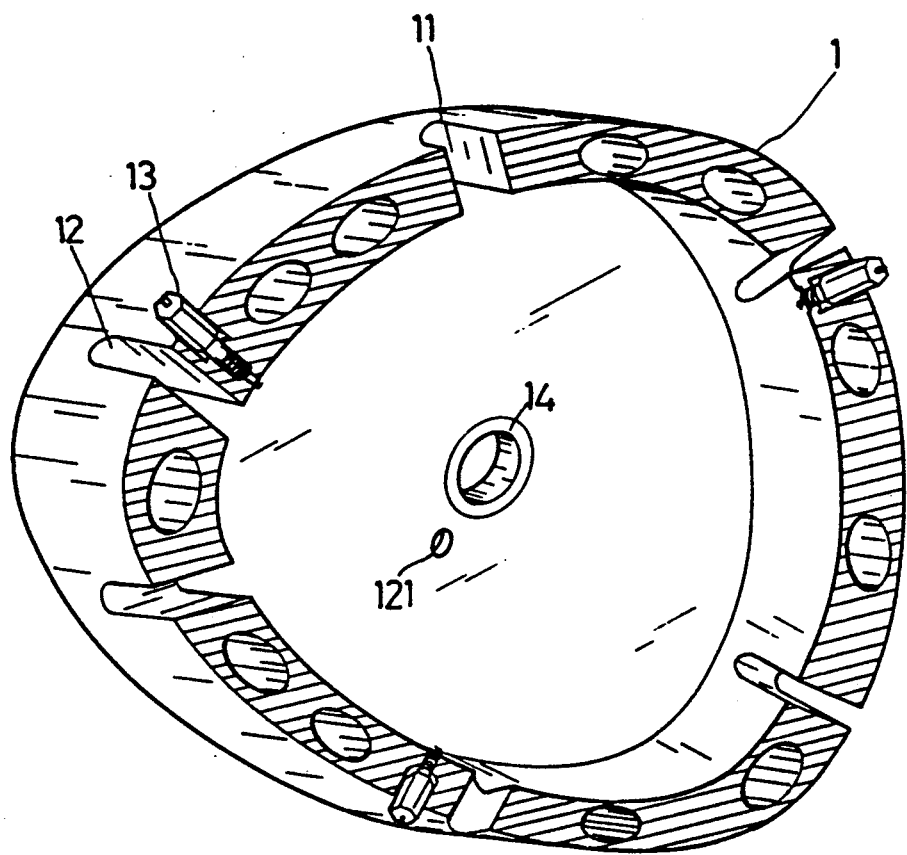
Figure 4:
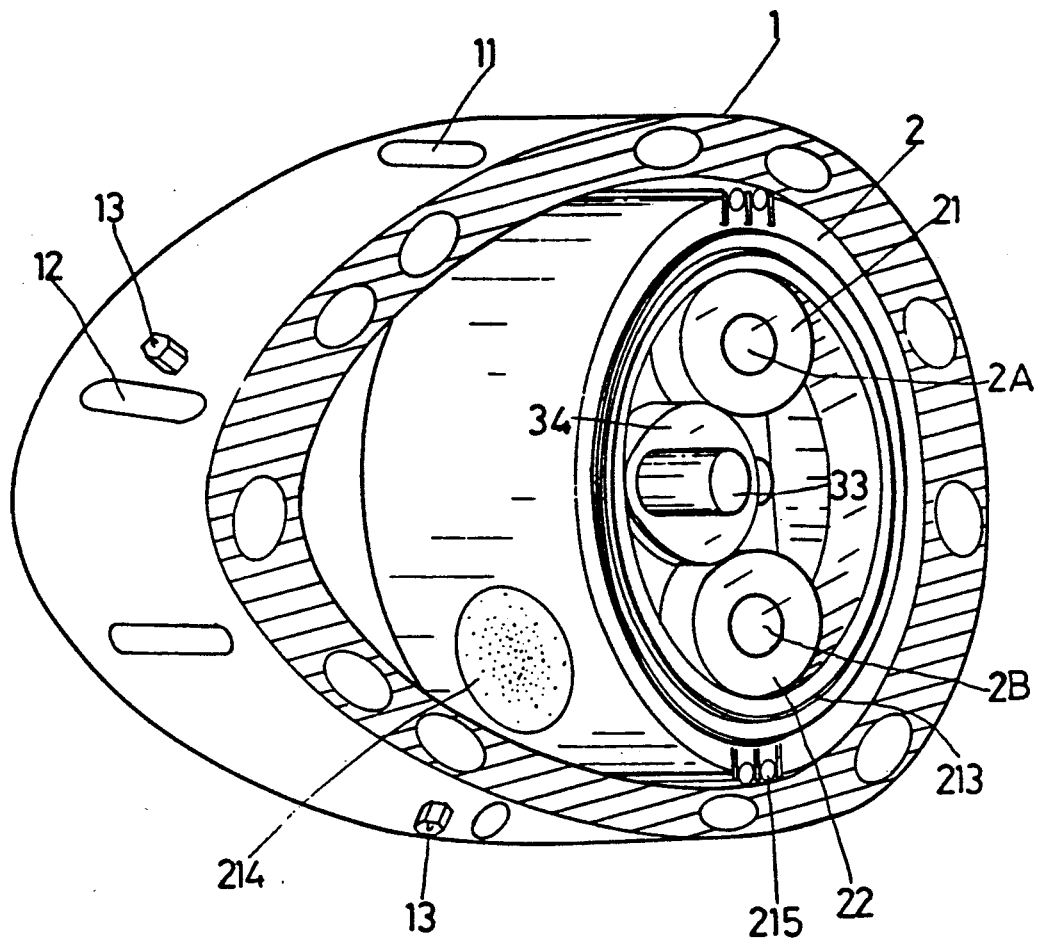
FIG. 4 is a perspective sectional view of the preferred embodiment of the present invention.
Figure 5:
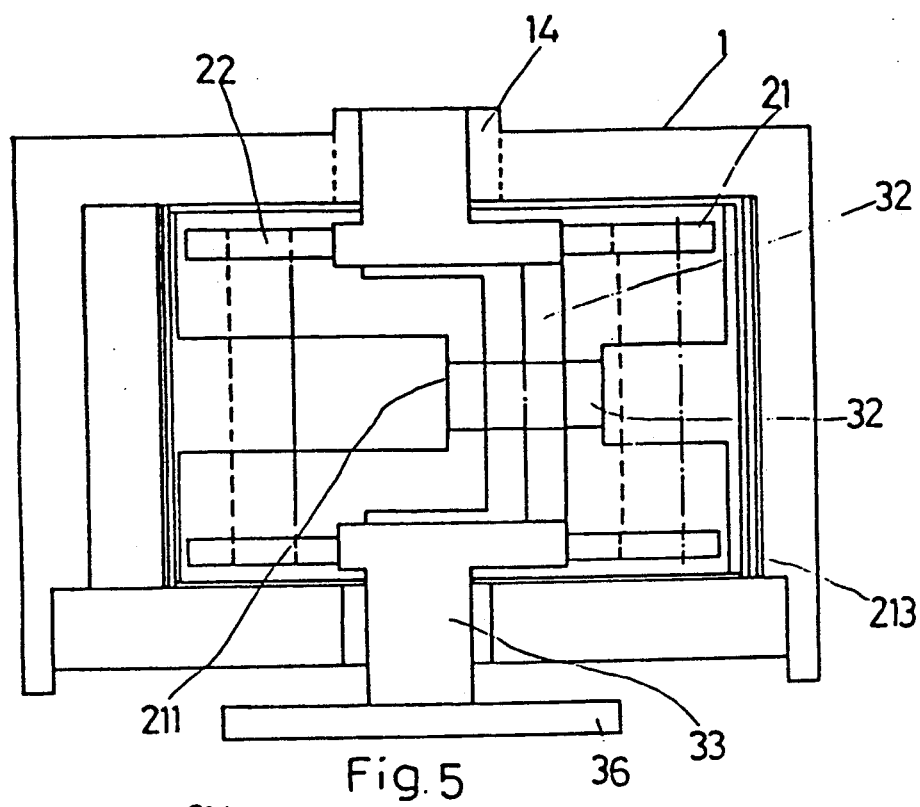
FIG. 5 is a sectional view illustrating the power output of the present invention.
Figure 6:
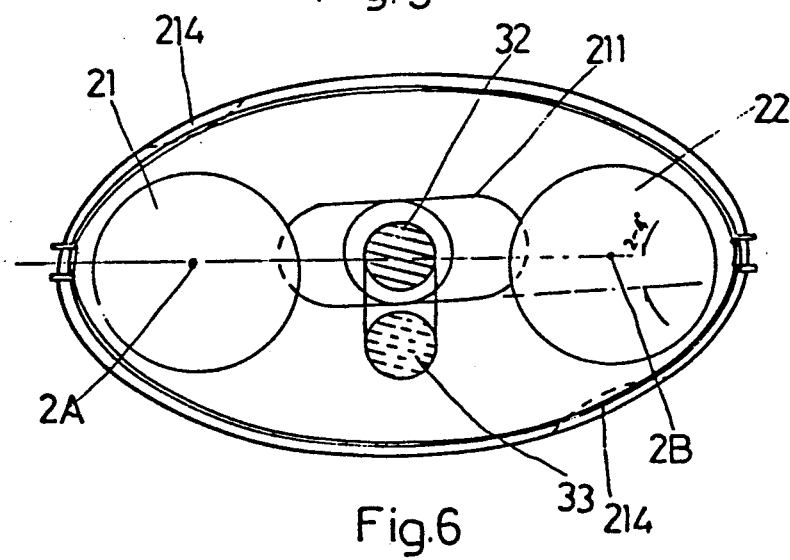
FIG. 6 is a schematic plan view of the rotor.
Figure 7:
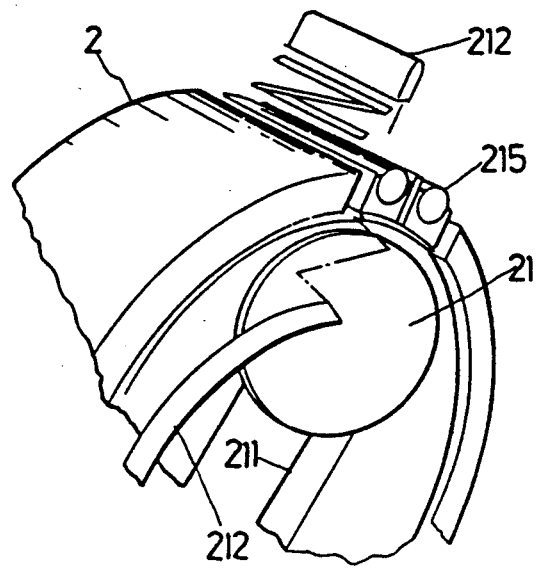
FIG. 7 is a partly enlarged view taken on FIG. 2.
Figure 8:
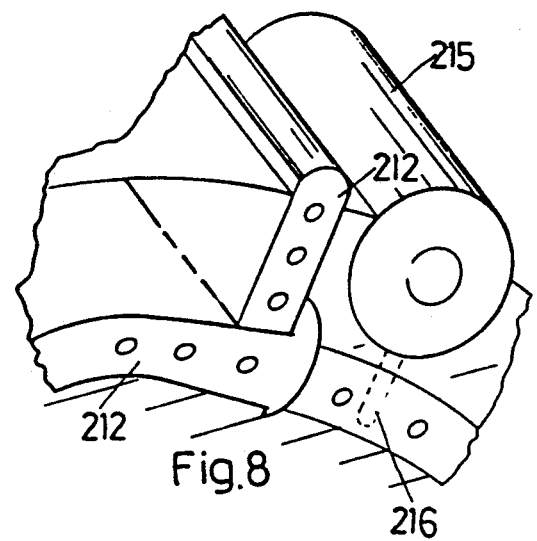
FIG. 8 is a partly enlarged view taken on FIG. 4, illustrating a roller and an area where barriers are overlapped.
Figures 9, 10:
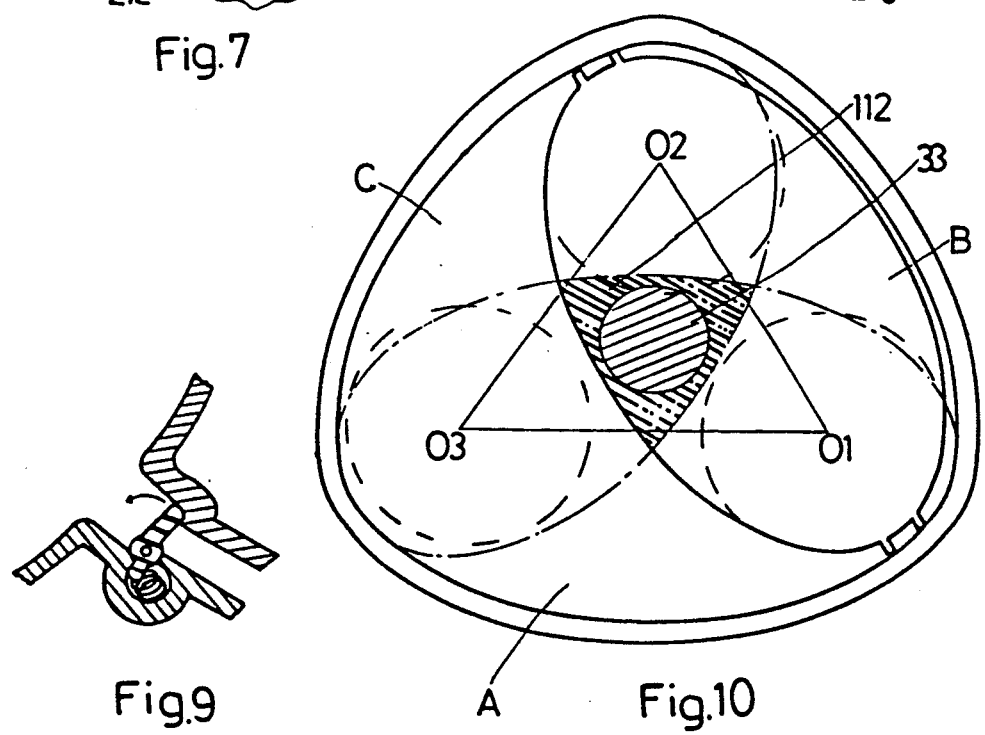
FIG. 9 is a sectional side view of an one-way intake valve according to the present invention.
FIG. 10 is a schematic drawing illustrating the intersected area inside the rotor.
Figure 15:
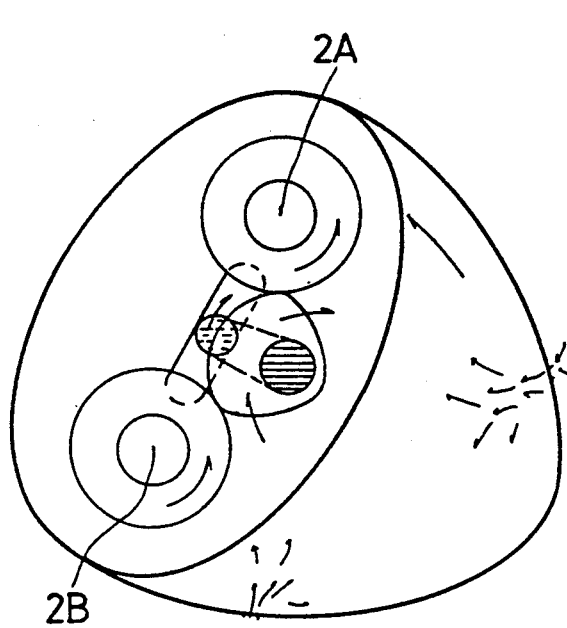
Figure 16:
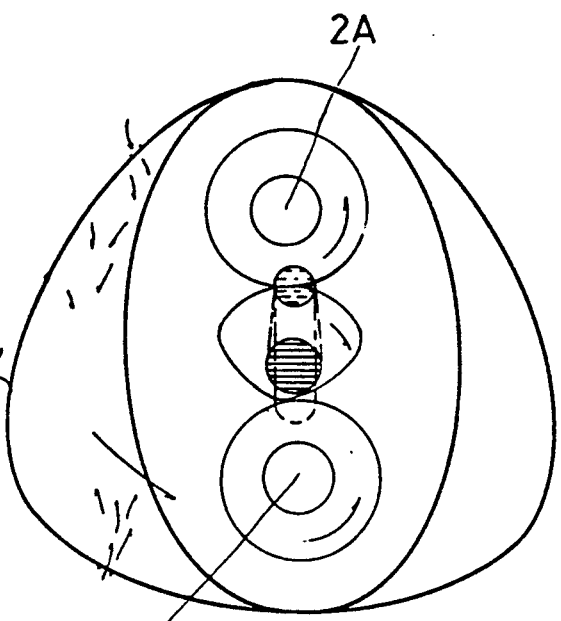
Figure 17:
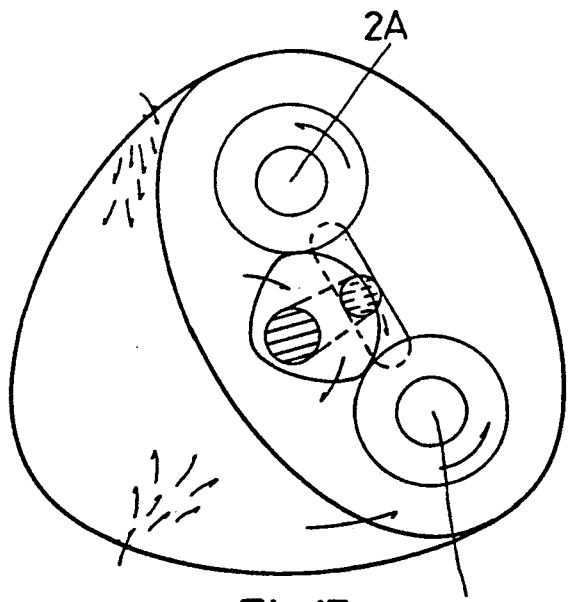
Figure 18:
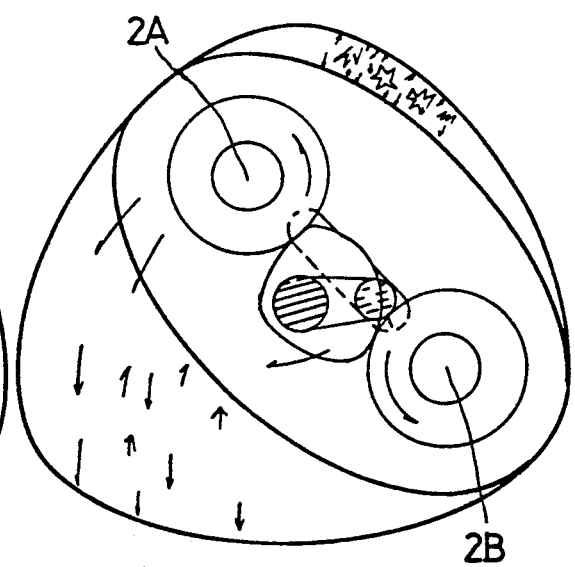

Referring to FIGS. 1, 4 and 10, a cylinder block 1 defines therein an approximately triangle chamber with a rotor 2 set to rotate therein. The three cylinder walls A, B, C inside the cylinder block 1 are respectively designed in such a curvature which serves as the track for another elliptic end while the rotor 2 is rotated through an angle of 60° on center 2A or 2B (see FIG. 10). The three circular ends of the triangular ellipsoidal cylinder block 1 are respectively designed in a curvature corresponding to the curvature of the small circular end of the rotor 2 (see FIG. 12). The three cylinder walls have each an intake port 11, an exhaust port 12 and an ignition plug 13 (see FIG. 1). The ignition plug 13 can be replaced with an oil nozzle for compression ignition. Exhaust port is most preferably disposed at a location corresponding to the combustion chamber near the traveling end of the rotor so as to extend the duration of the opening of exhaust valve during exhaust stroke. Intake port is most preferably disposed at a location near the instantaneous center (2A) so as to extend the duration of the opening of intake valve during intake stroke. Gas flows counter-clockwise along the rotary track of the rotor. Intake port can be designed in a one-way valve (see FIG. 9) permitting fuel gas to enter the cylinder block such that installation of cam wheel can be eliminated.

2. Rotor

Referring to FIGS. 1 through 4, the present invention comprises an oval rotor 2 set to rotate inside a substantially triangularly circular arc cylinder block 1 on axles 33 (see FIG. 4). the rotor 2 comprises two centers 2A, 2B having each two pulley wheels 21 or 22 respectively attached thereto at two opposite ends. A slide way 211 is made on the rotor 2 piercing through its center and biased 2°-4° from the center axis of the rotor for supporting a crank 3 permitting the crank 3 to slide therein (see FIGS. 3A and 3B). There are channels made in the rotor 2 at two opposite ends and the front and back peripheral areas for mounting barriers 212 to isolate internal space from external space. At each top of the rotor, two or three barriers 212 are fastened. There are an oil feeding holes 216 made on the rotor under and among barriers for lubrication themselves, the maximum pitch therebetween is larger than the width of the intake and exhaust ports and also the ignition hole so as not to interfere with the isolation effect while the rotor passing through intake and exhaust holes during its rotary motion. The rotor 2 has internally an I-bar shaped, transverse cross-section 213 with holes 217 made thereon at two opposite ends for equilibrium of air pressure. The metal structure of the rotor 2 is designed in such a manner that the space for the passing therethrough of engine oil inside the rotor is minimized, AT Least two rows of rollers 215 are respectively made on the rotor 2 at two opposite ends permitting the rotor 2 to smoothly rotate along the inner wall of the cylinder block 1. For an engine of small scale, the design of rollers 215 can be eliminated so that the outer barrier/-wall of the rotor 2 directly rubs against the inner wall of the cylinder block 1 during the rotary motion of the rotor 2. There is a recessed combustion chamber 214 made on the outer wall of the rotor 2 eccentrically at each side near rotating end thereof for receiving compressed air/gas and guiding explosive force in correct rotary direction.

The intake and exhaust ports according to the present invention are characterized in that either two of the three cylinder walls A, B, C are involved in the operation of each intake or exhaust port. Therefore, the intake and exhaust ports on either two cylinder walls are simultaneously used for operation (Each intake or exhaust port can be simultaneously controlled by two cam shafts) (see FIGS. 13-21).

Referring to FIG. 10, there is a substantially triangular arc area 112 formed around the axles 33 which is the intersected area 112 of the three rotary strokes of the rotor 2. Any angle the rotor 2 is disposed during its rotary motion the intersected area 112 is constantly covered within the rotor 2. The axles 33 are also constantly disposed within the intersected area 112. A plurality of holes 121 may be made on the cylinder block 1 within the intersected area 112 for the passing therethrough of engine oil and cooling air to lubricate and cool down the inner structure of the rotor 2.

3. Axles, Crank and Fanshaped wheels

Please refer to FIG. 3 regarding the illustration of the axles, crank and fanshaped wheel. The axles 33 are for output of engine power and bilaterally connected to a crank shaft 32 through two crank arms 30. The crank shaft 32 is movably fastened in the slide way 211 of the rotor 2. Two fanshaped wheels 34 designed in 120° sector are respectively mounted on the axles 33 and attached to the two crank arms 30 at two opposite sides. The crank arms 30 are respectively connected to the center of the 120° sector of the fanshaped wheels 34. The fanshaped wheels 34 have each a radius equal to the radius of the pulley wheels on the rotor 2 (see FIG. 12). The 120° sector of the fanshaped wheels 34 is a right circular arc. There is a 240° of curved circular arc 35 which is the intersecting line between the fanshaped wheels and the circumference of the pulley wheels when the fanshaped wheels is rotated clockwise through 120° relative to the rotor and the rotor is rotated counter-clockwise through 60°, i.e. the connected line made of the nearest distance between the circumference of the pulley wheels and the wheels and the center axis of the axles during the rotation of the rotor through 60° angle relative to the cylinder block. The intersecting points between the fanshaped wheels and the pulley wheels are always maintained within the connected line of center axis thereof. The fanshaped wheels are continuously in contact with the pulley wheels to guide the pulley wheels of the rotor to move along a certain track, permitting the relative motion between the crank shaft and the slide way to guide the rotor to move along a fixed route, and simultaneously prohibiting the crank shaft and the rotor from reverse rotation or displacement so as to keep the rotor to move stably.

B. PRINCIPLE OF OPERATION

1. The way the axles drive the rotor to move

As soon as engine is started, the axles 33 drive the rotor 2 to rotate (see FIG. 12). The axles 33 rotate clock-wise to carry the fanshaped wheels 34 to revolvably press on the lower left pulley wheels 22, permitting the fanshaped wheels 34 and the pulley wheels 22 to reversely make rotary motion. The crank shaft 32 simultaneously forces the slide way 211 of the rotor 2 to move transversely toward the axles so as to drive the rotor to counter-clockwise move upward, with its position at 4-8 hours changed to the position of 8-12 hours. The motion is repeated again and again. During first stroke, the intersecting point between the fanshaped wheels and the pulley wheels 2A, 2B is constantly within the regular circular arc of the 120° fanshaped wheel, which serves as a bearing when matching with the inner wall of the cylinder block. Therefore, when the rotor is rotated counter-clockwise through 60° angle, the lower left instantaneous center 03 (i.e. the center 2B of the pulley wheel) is located at a constant position, the upper pulley wheels 2A follows the rotor to rotate counter-clockwise along the 240° curved circular arc 35. At the same time, the 240° curved circular arc 35 gives support to the upper pulley wheels 2A and is maintained within a rotary track relative to the inner wall of the cylinder block. The 240° curved circular arc 35 also matches with the 120° circular arc to support the pulley wheels 2B and serves as a bearing to support the rotary motion of the rotor permitting the rotor to rotate smoothly and stably. The movement of the axles and the crank shaft is a clockwise circular motion relative to the engine, the movement of the crank shaft is a reciprocating linear motion relative to the slide way 211, and the movement of the rotor is a counter-clockwise circular motion relative to the cylinder block. It is counted a stroke when the rotor is moved through 60° angle relative to the cylinder block or the axles are rotated clockwise through 120° angle. Once the rotor has completed three strokes, it completes a cycle and the axles are also rotated through one full turn.

2. The way the rotor drives the axles

After the engine is started, the explosive force pushes the rotor to carry the axles to rotate, in same manner as described above, via the crank shaft. The axles are maintained by means of the inertial effect of the external pulley wheels 36 to smoothly rotate clockwise.

3. Principle of stability

The fanshaped wheels 34 are the key parts which keep the rotor to stably rotate. Referring to FIG. 10, the three instantaneous centers of the rotor are the three dead points 01, 02, 03, i.e. the upper dead point 02, the right dead point 01 and the left dead point 03. Referring to FIG. 12, before the start of a first stroke (see FIG. 20), the left pulley wheels 2B move along the curved circular arc 35 from the upper dead point 02 to the left dead point 03, the crank shaft 32 is simultaneously moved to the center of the slide way. Since the crank shaft is carried to make circular motion clockwise, after passing through the center of the slide way 211 the crank shaft moves leftward and to support and push the slide way 211 Continuously. When the fanshaped wheels 34 are rotated through 120° angle from a position corresponding to the cylinder wall B to a position corresponding to the cylinder wall A, each 120° circular arc thereof is maintained to support or press on the right pulley wheels 2A. Therefore, a seesaw-like lever motion is arisen. Once the pulley wheels 2B are moved to the left dead point 03, they are supported by the crank shaft 32 and the fanshaped wheels 34 to pause temporarily so as to prohibit the rotor 2 from hitting the inner wall of the cylinder block 1 at the time a last stroke just duly finished. After the start of the first stroke, the crank shaft 32 moves clockwise. Because the 120 circular arc of each fanshaped wheel 34 is rotated at the same time and exactly together with the crank shaft 32 (see FIG. 12-14), the left center of the rotor 2, i.e. the left pulley wheels 2B, during its first stroke, is confined by the 120° circular arc of the fanshaped wheel 34 within the left dead point 03. Immediately thereafter, the rotor 2 is carried by the crank shaft 32 and the slide way 211 to rotate upward. As soon as the right pulley wheels 2A are allocated at the upper dead point 02, the first stroke is completed. The second and third strokes are performed in the same manner. After the third stroke is completed, the rotor 2 is returned to the original position. During rotary motion, the rotor 2 is constantly externally keeping in contact with the inner wall of the cylinder block 1 and constantly internally supported by the crank shaft 32 and the fanshaped wheels 34. Therefore, during rotary motion of the rotor 2, the mechanical parts are constantly maintained in contact with each other. The main feature of the design is at the three dead points 01, 02, 03, which permit the rotor 2 to pause temporarily at every instantaneous center. Actually the rotational inertia drives the rotor 2 to move for next stroke can be repeated by a kind of seesaw-like mechanically momentum intertransferring between both end of the rotor. Since the rotor 2 runs through 60° angle per every stroke. In comparison with the conventional reciprocating piston which changes its moving direction per every reverse 180° angle, better rotational inertia, longer duration at upper and lower dead points and less vibration can be achieved by the present invention.

4. Factor of non-reverse rotation: Except the fanshaped wheel 34 can give a nonreverse rotation function through it's bearing effect the arrangement of the eccentric combustion chamber 214 and the biased slide way 211 (2°-4° away from center axis) also have the same function in which the explosive force does not vertically apply to the crank shaft when the rotor 2 and the crank shaft 32 are moved to every dead point. Therefore, the rotary motion of the rotor 2 keeps moving smoothly and will not be forced to change its direction reversely.

C. DESCRIPTION OF ROTATIONAL STROKE

When the rotor 2 is closely attached to the cylinder wall A during its rotation inside the cylinder block 1, presume that it is the first stroke of the rotor 2 when the rotor 2 is rotated on the instantaneous center 2B counter-clockwise through 60° angle to closely attach to the cylinder wall C (see FIG. 12 through 15); it is the second stroke of the rotor 2 when the rotor 2 is continuously rotated on the instantaneous center 2A counterclockwise through 60° angle to closely attach to the cylinder wall B (see FIG. 15 through 17); it is the third stroke of the rotor 2 when the rotor 2 is continuously rotated on the instantaneous center 2B counter-clockwise through 60° angle to return to attach to the cylinder wall A (see FIG. 18 through 21). Under this condition, the three strokes of the rotor are continuously rotated through the three ends of a regular triangle which form a cycle. This is meant that three strokes are completed per every revolution of the rotor 2, each stroke causes volume change at the two opposite sides of the rotor 2, and the circulatory volume change executes the function of internal combustion engine.

D. DESCRIPTION OF AUTO CYCLES

Referring to FIGS. 12 through 15, the rotor 2 moves from cylinder wall A to cylinder wall C during its first stroke, the volume at cylinder wall A is extended (see FIG. 13) for the performance of two Auto strokes, i.e. fuel gas intake and explosion, and the volume at cylinder wall C is reduced for the performance of compression or exhaust of gas. If cylinder wall A is determined for fuel gas intake (see FIG. 13) and cylinder wall C is for exhaust of gas, the rotor 2 starts a second stroke to revolve closely along the cylinder wall B (FIGS. 15 through 17) after the termination of a first stroke (FIGS. 12 through 15). Under this situation, the gas at cylinder wall B is turned into a compression stroke, and simultaneously the space at cylinder wall C which was just duly exhausted is turned into a fuel gas intake stroke. In the same manner, the volume at cylinder wall B in a third stroke becomes an explosive stroke, and the volume at cylinder wall A becomes a compression stroke. After three different strokes are performed, the rotor 2 returns to original position. The rotational motion of the rotor 2 is repeated again and again. Thus, four Auto cycles are resulted (see FIG. 24). As illustrated, after the rotor 2 revolves through 12 strokes a big cycle is started again, i.e. Auto cycle starts again after the rotor 2 as well as the axles 33 having revolved for four runs around a circle within the cylinder block 1, within which 6 times of explosion work, 6 times of fuel gas intake work, 6 times of compression work and 6 times of exhaust of gas are performed, i.e. total 24 times of works. In comparison with conventional reciprocating type 4-stroke engine (every time the axle of which revolves for 4 runs of Auto cycle, 8 times of works are performed) or 2-stroke engine (every time the axle of which revolves for 4 runs of Auto cycle, 16 times of works are performed), the present invention performs more works (3 times over 4-stroke engine or 1.5 times over 2-stroke engine). If the invention is designed in 2-stroke type Auto cycle (fuel gas intake and exhaust of gas are simultaneously performed), its output power can be doubled, i.e. 6 times of power over conventional 4-stroke engine or 3 times of power over conventional 2-stroke engine of equivalent cylinder volume.

E. COOLING

Similar to a conventional reciprocating type of engine, cooling of cylinder wall of the invention can be made either through water cooling or air cooling. However, cooling of internal space of the rotor 2 is made through different way. Mixed cooling fuel gas is guided, before fuel gas intake into the cylinder block 1, to pass through the intersected area 112 and then enter fuel gas intake port. Thus, most heat inside the rotor 2 is carried out of the cylinder block 1, mixing rate of fuel gas is increased, and combustion efficiency is improved.

F. LUBRICATION

Entrance of the mixture of gasoline and engine oil (in ratio of 50:1) in the cylinder block 1 of an engine of the invention simultaneously lubricates the mechanism of the engine, the crank shaft 3 and the pulley wheels 21, 22 are also internally lubricated by the mixed fuel gas which is guided therein for cooling purpose. There is another method to lubricate rotary mechanism parts by compressing engine oil to enter through hole 331 on either the axles 33 to the fanshaped wheels 34 and the crank shaft 32. When the rotor 2 is stopped, engine oil inside the rotor 2 is discharged out of the rotor 2 through bilateral drain holes 121 to an external engine oil tray for further circulation. During revolution of the rotor 2, engine oil is shaken by the rotor 2 to splash over the pulley wheels and the shafts thereof, and the rollers. Because the axles 33 revolve for one circle when the rotor 2 is rotated through three strokes, during each stroke of the rotary motion of the rotor 2 engine oil inside the rotor 2 is caused to produce a centrifugal inertia force and a centripetal inertia force relative to two opposite sides of the rotor 2. Engine oil under centripetal inertia force is turned to rotate through a spiral hole 3111 (see FIG. 3) toward an external engine oil tray for next circulation. Through the said circulation, the internal mechanism of the rotor 2 is well lubricated and cooled down, and no excessive volume of engine oil is allowed to maintain inside the rotor 2. There is a ring-shaped strip 213 set inside the inner barrier 212 to stop engine oil inside the rotor 2 from entering the cylinder block 1, which forces engine oil to coat over the inner wall surface of the cylinder 1 for barrier 212 lubrication.

In case the invention is designed for a big scale engine or compressor (for vessel, locomotive, power generator or industrial jumbo compressor), lubrication for barriers and top rollers must be made in another way as described hereinafter. The pulley wheels and the fanshaped wheels are peripherally designed with toothed portion 2121 for engagement, (see FIG. 22, 23) and the shaft of each pulley wheel is desinged as a screw pump 218. The rotary motion of the pulley wheels sucks proper amount of engine oil from two opposite ends gathered due to centrifugal effect inside the rotor and then guides the sucked engine oil to flow through the oil holes 216 toward the barriers and rollers.

Thus, the barriers and rollers can be properly lubricated during high temperature or high pressure operation.

I claim:

1. A rotary machine comprising a crank shaft, a cylinder block defining therein a triangular chamber for mounting said crank shaft in a central portion of said chamber, and an oval rotor slidably linked with said crank shaft to revolve around an inner wall surface of said chamber in said cylinder block, said oval rotor having a regular circular arc formed at one side thereof and having another circular arc with a different size formed at an opposite side thereof, wherein said rotor is alternatively rotated subsequently about each instantaneous oval center of three instantaneous oval centers respectively positioned at three end portions in said chamber in every 60 degrees angle change during its revolution around the inner wall surface of said cylinder block for finishing every cycle by passing through said three instantaneous centers at the three end portions of said chamber through three strokes of alternative changes of the instantaneous centers so as to drive said crank shaft to rotate and permit the change of space volume at two opposite sides between said rotor and said cylinder block to continuously and repeatedly perform a sequential operation cycle of a rotary machine;

said crank shaft slidably disposed in a slide way longitudinally formed in a central portion of said rotor, and bilaterally connected to two axles disposed on two opposite ends of said crank shaft for a power output through two crank arms and two 120-degree fanshaped wheels, each said fanshaped wheel pivotally connected between each said crank arm and each said axle, each said fanshaped wheel having a 120-degree regular circular arc formed on a first end portion of said fanshaped wheel and a 240-degree curved circular arc formed on a second end portion of said fanshaped wheel opposite to said first end portion of said fanshaped wheel for circumferentially continuously contacting with two pulley wheels rotatably secured on two opposite end portions of said rotor for guiding said pulley wheels to revolve along a fixed track of circular arc, said crank shaft being moved forward and backward inside said slide way to guide said rotor to revolve along a fixed direction, and wherein the matching of said crank shaft, said slide way, said fanshaped wheels and said pulley wheels permits the rotary machine to operate smoothly and prevents from its reverse rotation and displacement.

* * * * *